United States Patent [19]

Murakami et al.

[11] Patent Number: 6,130,312
[45] Date of Patent: Oct. 10, 2000

[54] PRODUCTION OF AROMATIC POLYAMIDE

[75] Inventors: Hidetatsu Murakami; Satoshi Omori; Kenji Wakatsuru, all of Kuga-gun, Japan

[73] Assignee: Mitsui Petrochemical Industries, Ltd., Tokyo, Japan

[21] Appl. No.: 08/968,941

[22] Filed: Nov. 12, 1997

Related U.S. Application Data

[63] Continuation of application No. 08/652,306, May 23, 1996, abandoned.

[30] Foreign Application Priority Data

May 24, 1995 [JP] Japan ..................... 7-125125

[51] Int. Cl.$^7$ ..................... C08G 69/26
[52] U.S. Cl. ..................... 528/339; 528/335; 528/347; 564/138; 564/139; 564/153
[58] Field of Search ..................... 564/138, 139, 564/153; 528/335, 339, 347

[56] References Cited

U.S. PATENT DOCUMENTS

| | | | |
|---|---|---|---|
| 3,454,536 | 7/1969 | Schade et al. | 260/78 |
| 4,385,170 | 5/1983 | Hirami et al. | 528/338 |
| 4,948,868 | 8/1990 | Taguchi et al. | 528/339 |
| 5,109,106 | 4/1992 | Lahary et al. | 528/349 |
| 5,128,442 | 7/1992 | Pipper et al. | 528/336 |

FOREIGN PATENT DOCUMENTS

| | | |
|---|---|---|
| 0 299689 | 1/1989 | European Pat. Off. |
| 0 384859 | 8/1990 | European Pat. Off. |
| 0 455066 | 11/1991 | European Pat. Off. |
| 4 329676 | 3/1994 | Germany |
| 07026015 | 1/1995 | Japan |
| 07082372 | 3/1995 | Japan |
| 07126380 | 5/1995 | Japan |
| 07126381 | 5/1995 | Japan |
| 1070416 | 6/1967 | United Kingdom |

*Primary Examiner*—Shailendra Kumar
*Attorney, Agent, or Firm*—Birch, Stewart, Kolasch & Birch, LLP

[57] ABSTRACT

A process for producing an aromatic polyamide which comprises:
(a) a dicarboxylic acid component which consists of 30–100 mol % of terephthalic acid and optionally 0–70 mol % of at least one dicarboxylic acid other than terephthalic acid, and (b) a diamine component which consists of 50–100 mol % of an aliphatic alkylenediamine of 4–25 carbons and optionally 0–50 mol % of at least one alicyclic diamine of 3–25 carbons, said process comprising a first step of performing melt reaction of said dicarboxylic acid with said diamine, thereby giving a low molecular weight condensate having an intrinsic viscosity [η] of 0.05–0.6 dl/g, a second step of subjecting it to solid phase polymerization, thereby giving an aromatic polyamide precursor having an intrinsic viscosity [η] of 0.5–1.0 dl/g, and a third step of subjecting it to melt polymerization, thereby giving an aromatic polyamide having a desired intrinsic viscosity [η] of 0.8–2.5 dl/g.

This process permits the industrial production of high molecular weight aromatic polyamides in an economical and efficient manner.

18 Claims, No Drawings

PRODUCTION OF AROMATIC POLYAMIDE

This application is a continuation of application Ser. No. 08/652,306 filed on May 23, 1996, now abandoned.

BACKGROUND OF THE INVENTION

1. Field of the Invention

The present invention relates to a process for producing a high molecular weight aromatic polyamide industrially in an economical and efficient manner.

2. Description of the Prior Art

Aliphatic polyamides such as nylon-6, nylon-66, and nylon-610 have been used as conventional engineering plastics in a broad range of application areas. They are superior in moldability but have a low glass transition temperature, e.g., about 60° C. in the case of nylon-66. This makes them unsuitable for use at high temperatures.

There is another type of polyamide. It includes aromatic polyamides, in which the dicarboxylic acid component is mainly comprised of aromatic dicarboxylic acids. They are superior to aliphatic ones in heat resistance and water resistance but suffer the disadvantage of requiring a high molding temperature because of their high melting point. The problem associated with a high molding temperature is that the cooling rate of a melt injected into a mold is much faster for aromatic polyamide than for aliphatic polyamide. Fast cooling causes the molded articles to have a low crystallinity, which in turn adversely affects stiffness at high temperatures.

To cope with this situation, the present inventors developed a new aromatic polyamide having good heat resistance and mechanical properties. It is composed of repeating units which consist of (a) a dicarboxylic acid component which consists of 60–100 mol % of terephthalic acid and optionally 0–40 mol % of at least one aromatic dicarboxylic acid other than terephthalic acid or straight chain aliphatic dicarboxylic acid of 6–18 carbons and (b) an alkylenediamine component. In addition, the aromatic polyamide has an intrinsic viscosity $[\eta]$ of 0.5–3.0 dl/g measured in concentrated sulfuric acid at 30° C., as described in Japanese Patent Laid-open No. 53536/1984.

The aromatic polyamide still has a disadvantage due to its high melting point. That is, it is subject to decomposition during production if it is produced in the same manner as the conventional aliphatic polyamides. Therefore, it cannot be produced efficiently.

To address this problem, the present inventors developed a new production process consisting of two steps. The first step is designed to give a low molecular weight condensate having an intrinsic viscosity $[\eta]$ of 0.05–0.2 dl/g, and the second step is designed to perform melt polymerization of the low molecular weight condensate in an extruder until a desired molecular weight is reached which is indicated by an intrinsic viscosity $[\eta]$ of 1.0–2.5 dl/g, as described in Japanese Patent Laid-open No. 196625/1985.

A disadvantage of this process is that a long residence time is necessary for melt polymerization of the low molecular weight condensate in an extruder. This leads to the necessity of using an extruder with a high L/D ratio or reducing extrusion outputs. In any way, the process needs a high capacity equipment as well as a large amount of thermal energy.

SUMMARY OF THE INVENTION

In order to approach the above mentioned problem associated with the production of aromatic polyamides, the present inventors carried out a series of researches which led to the finding that a high molecular weight aromatic polyamide can be produced economically and efficiently by the process which consists of performing melt reaction of a dicarboxylic acid with a diamine, thereby giving a low molecular weight condensate, subjecting it to solid phase polymerization in a vacuum or under a gas stream, thereby giving an aromatic polyamide precursor, and finally subjecting it to melt polymerization. The present invention is based on this finding.

Therefore, it is an object of the invention to provide a process for producing a high molecular weight polyamide economically and efficiently.

It is another object of the invention to provide a process for producing an aromatic polyamide containing a less amount of triamine and having a good color.

The invention provides a process for producing an aromatic polyamide which comprises:
(a) a dicarboxylic acid component which consists of 30–100 mol % of terephthalic acid and optionally 0–70 mol % of at least one dicarboxylic acid other than terephthalic acid, and
(b) a diamine component which consists of 50–100 mol % of an aliphatic alkylenediamine of 4–25 carbons and optionally 0–50 mol % of at least one alicyclic diamine of 3–25 carbons, said process comprising a first step of performing melt reaction of said dicarboxylic acid with said diamine, thereby giving a low molecular weight condensate having an intrinsic viscosity $[\eta]$ of 0.05–0.6 dl/g, a second step of subjecting it to solid phase polymerization, thereby giving an aromatic polyamide precursor having an intrinsic viscosity $[\eta]$ of 0.5–1.0 dl/g, and a third step of subjecting it to melt polymerization, thereby giving an aromatic polyamide having a desired intrinsic viscosity $[\eta]$ of 0.8–2.5 dl/g.

DETAILED DESCRIPTION OF THE INVENTION

According to the process of the invention, the first step is designed to give a low molecular weight condensate (or prepolymer) composed of the above mentioned dicarboxylic acid component and diamine component. The dicarboxylic acid component (a) consists of 30–100 mol % of terephthalic acid and optionally 0–70 mol % of a dicarboxylic acid other than terephthalic acid.

The low molecular weight condensate contains at least a repeating unit which consists of a terephthalic acid component (a-1) and an alkylenediamine component of 4–25 carbons (b). The aromatic polyamide derived from such a condensate contains a repeating unit represented by the formula [1-a] below.

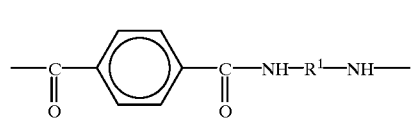

[1-a]

wherein $R^1$ denotes an alkylene group of 4–25 carbons in the diamine component which will be mentioned later.

According to the invention, it is not always necessary that the dicarboxylic acid component in the low molecular weight condensate be entirely the component represented by the formula [1-a] above. The terephthalic acid component (a-1) may partly contain an additional dicarboxylic acid other than terephthalic acid.

Examples of such an additional dicarboxylic acid component include an aromatic dicarboxylic acid component (a-2) other than terephthalic acid and a straight chain aliphatic dicarboxylic acid component of 6–18 carbons (a-3). Examples of the component (a-2) include isophthalic acid, 2-methylterephthalic acid or naphthalenedicarboxylic acid, among which isophthalic acid is particularly preferred.

In the case where isophthalic acid is additionally contained as an aromatic dicarboxylic acid component in the low molecular weight condensate, the resulting aromatic polyamide contains a repeating unit represented by the formula [1-b] below.

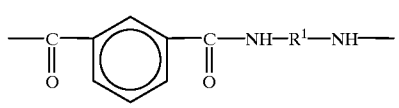

[1-b]

wherein $R^1$ denotes an alkylene group of 4–25 carbons in the diamine component which will be mentioned later.

Examples of the above mentioned straight chain aliphatic dicarboxylic acid component of 6–18 carbons (a-3) include succinic acid, adipic acid, azelaic acid or sebacic acid, among which adipic acid or sebacic acid is preferred.

In the case where an aliphatic dicarboxylic acid (a-3) is additionally contained as a dicarboxylic acid component, the resulting aromatic polyamide contains a repeating unit represented by the formula [1-c] below.

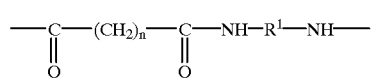

[1-c]

wherein $R^1$ denotes an alkylene group of 4–25 carbons in the diamine component which will be mentioned later, and n denotes an integer of 4–16.

As set forth above, the low molecular weight condensate is a prepolymer composed of the above mentioned dicarboxylic acid component (a) and diamine component (b). The diamine component (b) consists of 50–100 mol % of an aliphatic alkylenediamine of 4–25 carbons and optionally 0–50 mol % of at least one alicyclic diamine of 3–25 carbons.

The aliphatic diamine component is derived from aliphatic alkylenediamines having 4–25 carbons, preferably 6–18 carbons. The aliphatic diamine may be either straight chain one or branched one.

The straight chain alkylenediamine Includes, for example, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane or 1,12-diaminododecane.

In turn, the branched chain alkylenediamine includes, for example, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,5-diamino-2-methylpentane, 1,2-diaminao-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane or 1,9-diamino-5-methylnonane.

Of these examples, 1,6-diaminohexane, 1,8-diaminooctane, 1,10-diaminodecane, and 1,12-diaminododecane are preferable. They may be used alone or in combination with one another.

The alicyclic diamine should be one which has 3–15 carbons, preferably 6–18 carbons, and also has at least one alicyclic hydrocarbon ring.

The alicyclic diamine includes, for example, 1,3-diaminocyclohexane, 1,4-diaminocyclohexane, 1,3-bis(aminomethyl)clohexane, 1,4-bis(aminomethyl)clohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α, α'-bis(4-aminocyclohexyl)-p-diisoproylbenzene, α, α'-bis(4-aminocyclohexyl)-n-diisopropylbenzene, α, α'-bis(4-aminocyclohexyl)-1,4-cyclohexane or α, α'-bis(4-aminocyclohexyl)-1,3-cyclohexane.

Of these alicyclic diamines, 1,3-bis(aminomethyl)cyclohexane, bis(4-aminohexyl)methane, 1,3-bis(aminocyclohexyl)methane, 1,3-bis(aminomethyl)cyclohexane or 4,4'-diamino-3,3'-dimethyldicyclohexane is preferred. In particular, the second to fourth ones are preferred. The alicyclic diamine may be used alone or in combination with one another.

According to the invention, the dicarboxylic acid component (100 mol %) in the low molecular weight condensate comprises terephthalic acid component (a-1) in an amount of 30–100 mol %, preferably 40–80 mol %, more preferably 45–75 mol %; an aromatic dicarboxylic acid component other than terephthalic acid (a-2) in an amount of 0–70 mol %, preferably 0–60 mol %, more preferably 0–30 mol %; and an aliphatic dicarboxylic acid component (a-3) in an amount of 0–70 mol %, preferably 20–60 mol %, more preferably 25–55 mol %. It is preferred that the diamine component in the low molecular weight condensate is composed of the straight chain alkylene diamine as mentioned hereinabove.

According to the invention, the low molecular weight condensate is obtained by the reaction of one molar part of the dicarboxylic acid with about one molar part of the diamine with heating, preferably in the presence of water and a phosphorus compound as a catalyst. The reaction is carried out preferably under pressure, usually in an atmosphere of an inert gas. Incidentally, the dicarboxylic acid and diamine may be replaced by their salt.

The phosphorus compound is exemplified by phosphoric acid, or salts or esters thereof, phosphorous acid, or salts or esters thereof, phosphinic acid, or salts or esters thereof.

Examples of the phosphate salts include potassium phosphate, sodium phosphate, calcium phosphate, magnesium phosphate, manganese phosphate, nickel phosphate or cobalt phosphate. Examples of phosphate esters include methyl phosphate, ethyl phosphate, isopropyl phosphate, butyl phosphate, hexyl phosphate, isodecyl phosphate, octadecyl phosphate, decyl phosphate, stearyl phosphate or phenyl phosphate.

Examples of the phosphite salts include potassium phosphite, sodium phosphite, calcium phosphite, magnesium phosphite, manganese phosphite, nickel phosphite or cobalt phosphite. Examples of the phosphite esters include methyl phosphite, ethyl phosphite, isopropyl phosphite, butyl phosphite, hexyl phosphite, isodecyl phosphite, octadecyl phosphite, decyl phosphite, stearyl phosphite or phenyl phosphite.

Examples of the phosphinate salts include potassium phosphinate, sodium phosphinate, calcium phosphinate, barium phosphinate, magnesium phosphinate, manganese phosphinate, nickel phosphinate or cobalt phosphinate. These phosphorus compounds may be used alone or in combination with one another.

The phosphorus compound may be used in an amount of 0.01–5 mol %, preferably 0.02–2 mol %, for the dicarboxylic acid. Water is used in an amount of 0–20% by weight of the total amount of the dicarboxylic acid and diamine used. The reaction may optionally employ a monocarboxylic acid or a monoamine compound as a blocking agent for the molecular terminals. The blocking agent may be used in an amount of 0–3 mol % for the dicarboxylic acid or diamine used.

The low molecular weight condensate may be prepared by the reaction which is carried out usually at 200–290° C., preferably 220–280° C., usually for 0.5–5 hours, preferably for 1–3 hours, under atmospheric pressure, preferably under pressure usually of 20–60 kg/cm$^2$, preferably 25–50 kg/cm$^2$.

According to the invention, the low molecular weight condensate may also be prepared by the reaction of the dicarboxylic acid with the diamine in the presence of a small amount of at least one ω-aminocarboxylic acid or the corresponding lactam.

Suitable ω-aminocarboxylic acids include 4-aminobutanoic (γ-aminobutyric) acid, 5-aminopentanoic (σ-aminovaleric) acid, 6-aminohexanoic (ε-aminocaproic) acid, 7-aminoheptanoic acid, 8-aminooctanoic acid, 10-aminodecanoic acid and 1-aminoundecanoic acid. The corresponding lactams are the cyclic amides formed by self-amidation of the aminocarboxylic acids. Examples include γ-butyrolactam, σ-valerolactam, ε-caprolactam and ω-laurolactam.

The resulting aromatic polyamide includes a repeating unit of aliphatic polyamide component derived from such an ω-aminocarboxylic acid or lactam. The amount of the aliphatic polyamide component derived from the ω-aminocarboxylic acid or lactam may be not more than 20 mol %, preferably not more than 10 mol % of the total repeating units of the resultant aromatic polyamide.

The first step for polycondensation of the dicarboxylic acid with the diamine by melt reaction gives rise to a low molecular weight condensate in solid form which has an intrinsic viscosity [η] of 0.05–0.6 dl/g, preferably 0.08–0.3 dl/g, measured at 30° C. in concentrated sulfuric acid. This measurement condition is also used in the following.

It is preferred that the low molecular weight condensate is freed of water as well as it has a controlled crystallinity before it is subjected to the second step for solid phase polymerization. More specifically, it is preferred that the water content should be reduced to 5000 ppm or less, and the crystallinity should be increased to 20% or above. This procedure is not mandatory, though.

The control of water content and crystallinity may be accomplished by heating the low molecular weight condensate at a temperature which is lower than the heating temperature in the second step. Namely, the low molecular weight condensate way be heated at a temperature in the range of 50–170° C., preferably at 100–150° C. so that it has a desired water content and crystallinity as above mentioned.

According to the present invention, the second step is designed to heat the low molecular weight condensate in a vacuum or under a gas stream for solid phase polymerization. The reaction for solid phase polymerization may be carried out continuously or batchwise by using an equipment of any type, vertical or horizontal, stationary, rotary, or stirring.

The solid phase polymerization is carried out usually in the range of a temperature from 170° C. to a temperature less than the melting point of the low molecular weight condensate, preferably at 200–260° C., usually for 0.03–6 hours, preferably for 0.1–2 hours.

The solid phase polymerization may be carried out in a vacuum or under a gas stream, particularly under an inert gas stream. The amount of gas stream should be 1–500 liters, preferably 20–300 liters, per 1 kg of the low molecular weight condensate.

The solid phase polymerization may also be carried out in the presence of a small amount of at least one ω-aminocarboxylic acid or the corresponding lactam so that the resulting aromatic polyamide contains the repeating units derived from the ω-aminocarboxylic acid or lactam in an amount of not more than 20 mol %, preferably not more than 10 mol % of the total repeating units.

The solid phase polymerization gives rise to an aromatic polyamide precursor having an intrinsic viscosity [η] of 0.5–1.0 dl/g, preferably 0.65–0.8 dl/g.

According to the invention, the aromatic polyamide precursor is then subjected to the third step for polycondensation by melting under shear stress. The third step gives rise to an aromatic polyamide with a desired high degree of polymerization. Melting under shear stress may be accomplished by using a vented twin-screw extruder, kneader, or Brabender.

The melt polycondensation as the third step is carried out usually in the range of a temperature which is higher than the melting point of the precursor by about 5° C. to a temperature which is higher than the melting point of the precursor by about 150° C., usually in the range of 320–350° C., preferably under a reduced pressure. The residence time in the melt reactor such as an extruder is usually between 0.5 to 10 minutes.

If necessary, the melt polycondensation may be carried out in the presence of an ω-aminocarboxylic acid or the corresponding lactam in such an amount as mentioned hereinbefore.

The aromatic polyamide thus obtained according to the invention has an intrinsic viscosity [η] of 0.8–2.5. dl/g, preferably 1.0–2.0 dl/g, and a glass transition temperature of 70–125° C., preferably 80–125° C. It is usually crystalline and has a melting point usually in the range of 260–360° C., and more particularly in the range of 280–330° C.

The thus obtained aromatic polyamide is suitable for injection molding to make electronic parts and the like which need heat resistance.

As set forth above, according to the process of the invention, a low molecular weight condensate having a specific intrinsic viscosity [η] is first prepared by the reaction of a dicarboxylic acid and a diamine, the low molecular weight condensate is then subjected to solid phase polymerization so as to provide an aromatic polyamide precursor having a specific intrinsic viscosity [η], and finally the precursor is subjected to melt polycondensation so as to provide a high molecular weight aromatic polyamide having a desired intrinsic viscosity [η]. Accordingly, the process permits the production of three times as much high molecular weight aromatic polyamide as the conventional process in which the low molecular weight condensate as such undergoes melt polycondensation, when a reactor of the same capacity is used. Thus the process of the invention permits the economical and efficient production of aromatic polyamides suitable for specific objects and applications. In addition, the resulting aromatic polyamide contains a less amount of triamine and has a good color because of its limited heat history at high temperatures.

The invention will be described with reference to the following examples, which are not intended to restrict the scope of the invention.

EXAMPLE 1

(Preparation of low molecular weight condensate)

A 200-liter reactor was charged with 58.5 kg (503 mol) of 1,6-diaminohexane, 45.7 kg (275 mol) of terephthalic acid, 32.9 kg (225 mol) of adipic acid, 106 g (1.00 mol) of sodium phosphinate as a catalyst, 763 g (6.25 mol) of benzoic acid as a terminal blocking agent, and 14 liters of water. The molar ratio of terephthalic acid to adipic acid was 55/45. After the atmosphere in the reactor was replaced by nitrogen, the reaction was carried out at 250° C. for one hour under a pressure of 35 kg/cm$^2$.

The reaction product was flashed into the atmosphere through a nozzle so as to perform solid-liquid separation and cooling simultaneously. After drying, there was obtained 122 kg of a low molecular weight condensate. This product was found to have an intrinsic viscosity [η] of 0.15 dl/g, a melting point of 305° C., and an average particle diameter of 300 μm.

(Preparation of aromatic polyamide precursor A)

In the subsequent step, 40 kg of the low molecular weight condensate was placed in a paddle dryer (made by Nara Kikai Manufacturer) having an effective volume of 0.065 m$^3$. With the paddle rotating at 30 rpm, the condensate was heated from 12° C. to 240° C. over 83 minutes and then kept at 240° C. for 18 minutes under a nitrogen gas stream at a rate of 80 liters per minute, thereby providing 36 kg of an aromatic polyamide precursor A having an intrinsic viscosity [η] of 0.70 dl/g.

(Preparation of high molecular weight aromatic polyamide)

The aromatic polyamide precursor A was continuously fed into a twin-screw extruder having a diameter of 57 mm and an L/D ratio of 42 at a rate of 100 kg/hour, with the cylinder temperature set at 350° C. and the screw speed set at 200 rpm so that the precursor A underwent melt polycondensation, thereby providing an aromatic polyamide having a desired high molecular weigt. The aromatic polyamide was found to have an intrinsic viscosity [η] of 1.03 dl/g and a melting point of 310° C.

COMPARATIVE EXAMPLE 1

The low molecular weight condensate obtained in Example 1 was continuously fed into a twin-screw extruder having a diameter of 57 mm and an L/D ratio of 42 at a rate of 25 kg/hour, with the cylinder temperature set at 350° C. and the screw speed set at 200 rpm so that the low molecular weight condensate underwent melt polycondensation, thereby providing a high molecular weight aromatic polyamide. The aromatic polyamide was found to have an intrinsic viscosity [η] of 1.14 dl/g and a melting point of 310° C.

COMPARATIVE EXAMPLE 2

(Preparation of aromatic polyamide precursor B)

An amount of 40 kg of the low molecular weight condensate obtained in Example 1 was placed in the same paddle dryer as in Example 1. With the paddle rotating at 30 rpm, the condensate was heated from 15° C. to 220° C. over 54 minutes and then kept at 220° C. for 14 minutes under a nitrogen gas stream at a rate of 80 liters per minute, thereby providing 36.kg of an aromatic polyamide precursor B having an intrinsic viscosity [η] of 0.34 dl/g.

(Preparation of high molecular weight aromatic polyamide)

The aromatic polyamide precursor B was continuously fed into a twin-screw extruder having a diameter of 57 mm and an L/D ratio of 42 at a rate of 70 kg/hour, with the cylinder temperature set at 350° C. and the screw speed set at 290 rpm so that the precursor underwent melt polycondensation, thereby providing a high molecular weight aromatic polyamide. The aromatic polyamide was found to have an intrinsic viscosity [η] of 0.93 dl/g and a melting point of 310° C.

What is claimed is:

1. A process for producing an aromatic polyamide which comprises:
    (a) a dicarboxylic acid component which consists of 30–100 mol % of terephthalic acid and optionally 0–70 mol % of at least one dicarboxylic acid other than terephthalic acid, and
    (b) a diamine component which consists of 50–100 mol % of an aliphatic alkylenediamine of 4–25 carbons and optionally 0–50 mol % of at least one alicyclic diamine of 3–25 carbons, said process comprising a first step of performing melt reaction of said dicarboxylic acid with said diamine, thereby giving a low molecular weight condensate having an intrinsic viscosity [η] of 0.05–0.6 dl/g, a second step of subjecting it to solid phase polymerization, thereby giving an aromatic polyamide precursor having an intrinsic viscosity [η] of 0.5–1.0 dl/g, and a third step of subjecting it to melt polymerization, thereby giving an aromatic polyamide having a melting point at 260–360° C. and a desired intrinsic viscosity [η] of 0.8–2.5 dl/g.

2. A process as defined in claim 1 wherein the dicarboxylic acid component (a) consists of 40–80 mol % of terephthalic acid and 20–60 mol % of at least one aliphatic dicarboxylic acid, and the diamine component (b) consists of at least one straight chain alkylenediamine.

3. A process as defined in claim 1 wherein the first step gives rise to a low molecular weight condensate having an intrinsic viscosity [η] of 0.08–0.3 dl/g, the second step gives rise to an aromatic polyamide precursor having an intrinsic viscosity [η] of 0.65–0.8 dl/g, and the third step gives rise to an aromatic polyamide having an intrinsic viscosity [η] of 1.0–2.0 dl/g.

4. A process as defined in claim 1, wherein the dicarboxylic acid component (a) comprises 45–75 mol % of terephthalic acid and 25–55 mol % of at least one aliphatic dicarboxylic acid, and the diamine component (b) comprises at least one straight chain alkylene diamine.

5. A process as defined in claim 2, wherein the dicarboxylic acid component (a) includes an aromatic dicarboxylic acid component other than terephthalic acid in an amount of from 0 to 60 mol %.

6. A process as defined in claim 2, wherein the aromatic dicarboxylic acid component includes an aromatic dicarboxylic acid component other than terephthalic acid in an amount of from 0 to 30 mol %.

7. A process as defined in claim 1, wherein the first step is carried out at a temperature of 200–290° C. for from 0.5 to 5 hours under atmospheric pressure.

8. A process as defined in claim 1, wherein the first step is carried out at a temperature of 220–280° C. for from 1 to 3 hours under a pressure of 20 to 60 kg/cm$^2$.

9. A process as defined in claim 1, wherein the first step is carried out at a temperature of 220–280° C. for from 1 to 3 hours at a pressure of 25 to 50 kg/cm².

10. A process as defined in claim 1, wherein the low molecular weight condensate product of the first step is heated and freed of water to 5000 ppm or less of water and the crystallinity is increased to at least 20% before subjecting the product to a second step.

11. A process as defined in claim 1, wherein the second step is carried out at a temperature of from 170° C. to a temperature of less than the melting point of the low molecular weight condensate product of the first step.

12. A process as defined in claim 11, which is carried out at a temperature of 200–260° C. in the second step.

13. A process as defined in claim 11, wherein the second step is carried out for from 0.03 to 6 hours.

14. A process as defined in claim 11, wherein the process is carried out for from 0.1 to 2 hours.

15. A process as defined in claim 1, wherein the third step is carried out by melting under shear stress.

16. A process as defined in claim 15, wherein the melting under shear stress is carried out in a shear stress apparatus comprising either a vented twin-screw extruder, or a kneader or Brabender.

17. A process as defined in claim 15, wherein the third step is carried out at a temperature that is higher than the melting point of the product from step 2 by about 150° C. for from 0.5 to about 10 minutes residence time in the shear stress apparatus.

18. A process as defined in claim 15, wherein the third step is carried out at a temperature from about 320–350° C. for from 0.5 to 10 minutes residence time in the shear stress apparatus.

* * * * *